(No Model.) 2 Sheets—Sheet 1.

S. W. WARDWELL, Jr.
WRENCH.

No. 583,346. Patented May 25, 1897.

Witnesses. Inventor.

(No Model.) 2 Sheets—Sheet 2.

S. W. WARDWELL, Jr.
WRENCH.

No. 583,346. Patented May 25, 1897.

Witnesses.
J. C. Hinkel
C. Harrison

Inventor.
Simon W. Wardwell, Jr.
By Foster Freeman
attys

UNITED STATES PATENT OFFICE.

SIMON W. WARDWELL, JR., OF PROVIDENCE, RHODE ISLAND.

WRENCH.

SPECIFICATION forming part of Letters Patent No. 583,346, dated May 25, 1897.

Application filed June 5, 1896. Serial No. 594,355. (No model.)

*To all whom it may concern:*

Be it known that I, SIMON W. WARDWELL, Jr., a citizen of the United States, residing at Providence, in the county of Providence, State of Rhode Island, have invented certain new and useful Improvements in Wrenches, of which the following is a specification.

The object of my invention is to construct a wrench which will be of great strength, with wide bearing-faces upon the jaws, handy to manipulate, and inexpensive to manufacture; and to this end I make the wrench of three main parts, as fully set forth hereinafter and as illustrated in the accompanying drawings, in which—

Figure 1:
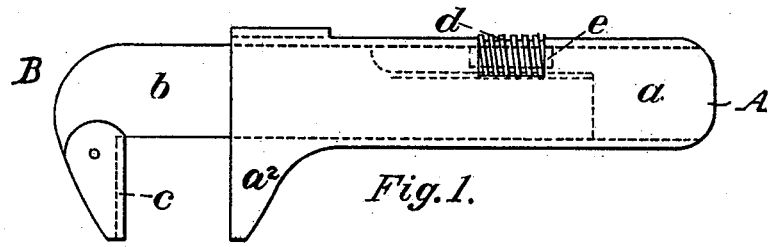
Figure 3:
Figure 2:
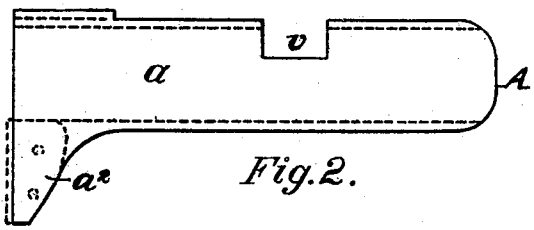
Figure 4:
Figure 6:
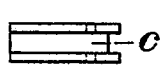
Figure 5:
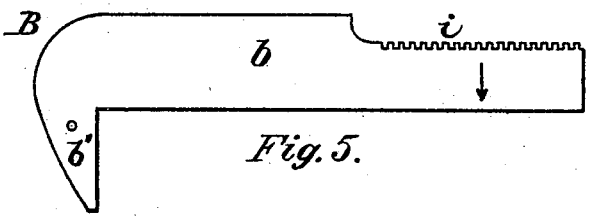
Figure 7:
Figure 8:
Figure 9:
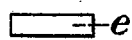
Figure 11:
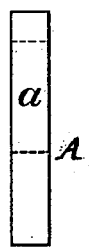
Figure 10:
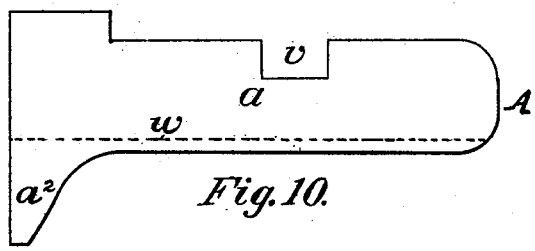
Figure 12:
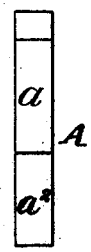
Figure 13:
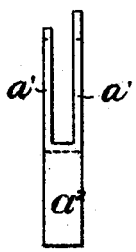
Figure 15:
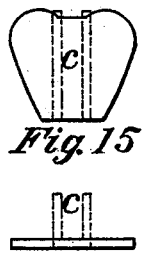
Figure 14:
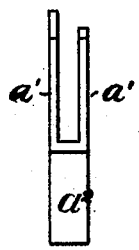
Figure 16:
Figure 17:
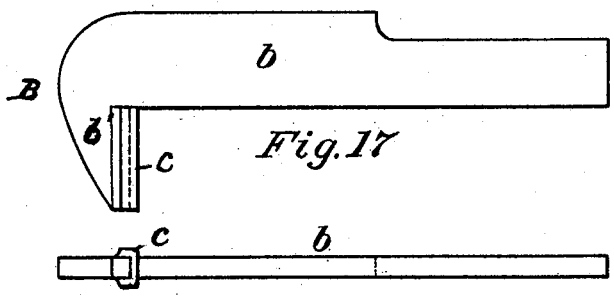
Figure 18:
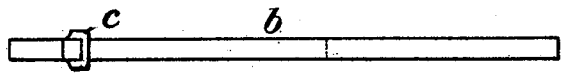
Figure 19:
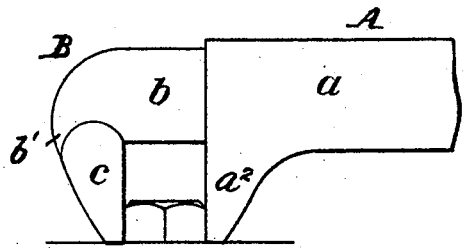
Figure 20:
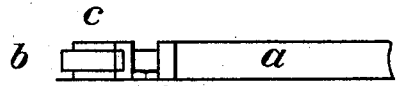

Figure 1 is a side view of my improved wrench; Fig. 2, a detached side view of the handle portion or section of the wrench; Fig. 3, an end view of Fig. 2; Fig. 4, an opposite end view of Fig. 2; Fig. 5, a detached view of the sliding portion of the wrench; Fig. 6, an edge view of the shoe to be applied to the jaw of the wrench; Fig. 7, a side view of the shoe; Fig. 8, a side view of the worm; Fig. 9, a side view of the axis or pin of the worm; Fig. 10, a side view of the stock from which the handle portion of the wrench is made; Figs. 11 and 12, opposite end views of the parts shown in Fig. 10; Fig. 13, an end view of the handle-section after the same has been milled to form the recess for the sliding portion and looking toward the end which has the jaw; Fig. 14, an end view looking from the opposite end; Fig. 15, a plan view of the blank from which the shoe is made; Fig. 16, an edge view of said blank; Figs. 17 and 18, a side view and edge view of the sliding part of the wrench, illustrating a modification; Figs. 19 and 20, views illustrating the mode in which the wrench is applied to nuts of different sizes.

The wrench consists of three main parts, the handle portion A, supporting the fixed jaw $a^2$, the sliding portion B, supporting the sliding jaw $b'$, and the feed and locking device $d$, shown as consisting of a worm, which may be either at the front or the back of the handle portion, engaging a rack either at the front or the back edge of the shank $b$ of the sliding portion B.

The handle portion has a longitudinal recess $s$, (see Figs. 3 and 4,) adapted to receive the stem $b$ of the part B, and the latter is cut away at one side, as shown, from the back, and the edge is provided with teeth, so as to form a rack $i$ at such a distance from the back edge of the shank $b$ as will permit the worm $d$ to engage the rack without projecting beyond the edge of the handle to any material extent.

The handle portion $a$ of the section A is cut away at $v$ to form a transverse recess equal to the length of the worm, and the worm is provided with projecting trunnions which extend between the cheeks $a'$ $a'$ of the handle portion, whereby the worm is retained in place. When the handle portion is cut away only to the extent illustrated in full lines, Figs. 1 and 2, it is necessary to provide a movable stud or pin $e$, extending through an opening in the worm $d$, which stud is introduced after the worm is put into place by passing the stud longitudinally through the channel $s$ and into the opening of the worm.

Difficulty has heretofore been experienced in connection with wrenches stamped from metallic plates in consequence of the lack of sufficient body or width in the jaw or jaws. This has led to forging parts from thick material or to the use of thick material in the first instance, which is cut down so as to reduce the main portion to the desired thickness, leaving the jaw of the necessary width. Such operations are expensive, and to secure the desired thickness without such operation and make an effective wrench and at the same time avoid expensive manipulation I provide the jaw with a shoe, which is applied to the inner edge of the jaw, the flanges of the shoe lapping the sides of the jaw and being secured thereto in any suitable manner. Thus, as shown in Figs. 1, 5, 6, 7, 15, and 16, I take a plate, the form of which is shown in Figs. 15 and 16, and bend up the side edges, so as to form two parallel wings, thus producing a shoe $c$, which is applied over the edge of the jaw $b'$, Fig. 5, and is then secured in place either by riveting, as shown, or by brazing or otherwise, imparting the desired thickness to the jaw. Instead of bending the edges of the plate, as shown, a bar may be milled to form a recess to receive the edge of the jaw $b'$, as shown in Figs. 17 and 18. With the widened jaw or jaws, as set forth, the wrench may be applied endwise to a nut, as illustrated in Fig. 19, or sidewise, as shown in Fig. 20, thereby securing the broad bearing of the outer jaw necessary to coincide with the thickness of the jaw of the handle part to avoid the wounding of the nut or other part to be turned.

In making the section A, I first take a plate of metal of the thickness illustrated in Figs. 11 and 12, cut it by dies or otherwise to the outline illustrated in Fig. 10, and then mill it from the back edge to the line $w$, Fig. 10, so as to leave the two cheek-pieces $a'$ $a'$, Figs. 13 and 14. I then place a hardened former of proper shape between the cheeks and bend over the ends of the cheeks at the narrowest portions, so as to cause them to abut or nearly abut, as shown in Fig. 4, and bend in the edge of one cheek and fold the other over it at the widest portions, so as to overlap, as illustrated in Fig. 3. The abutting edges and the overlapping portions may, if desired, be brazed together, or they may be bent into position without otherwise connecting them, thus forming the longitudinal recess $s$.

The section B is cut or punched from a plate of uniform thickness, the rack $i$ being cut upon one edge when a rack is used, and the jaw $b'$ is formed as described. By this means I am enabled to form a wrench which possesses great strength, is extremely simple, has but three main parts, is handy, and with jaws having extended bearing-surfaces, while the cost of manufacture is very slight compared with that of ordinary wrenches.

While I have illustrated a worm as a means of feeding and locking the movable part of the wrench, I may make use of any other of the usual feeding and locking devices instead of this means.

Without limiting myself to the precise construction and arrangement shown, I claim as my invention—

1. A wrench, consisting of a handle portion having a jaw, a longitudinal recess and a transverse recess at one edge intersecting the longitudinal recess, a movable member having a jaw and a shank, said shank extending into the longitudinal recess of the handle and having one of its edges cut away and toothed, and a screw within the transverse recess of the handle and engaging the teeth of the shank, substantially as described.

2. A wrench, consisting of a handle portion having a jaw, a longitudinal recess and a transverse recess at one edge intersecting the longitudinal recess, a movable member having a jaw, and a shank, said shank extending into the longitudinal recess of the handle and having one of its edges cut away and toothed, a screw within the transverse recess of the handle engaging the teeth of the shank and trunnions projecting from the ends of the screw and extending into the longitudinal recess of the handle, substantially as described.

In testimony whereof I have signed my name to this specification in the presence of two subscribing witnesses.

SIMON W. WARDWELL, JR.

Witnesses:
EDWIN C. SMITH,
H. A. COOK.